Feb. 5, 1924.　　　　　T. H. ROBERTS　　　　1,482,484
BIB COCK
Filed Nov. 14, 1921
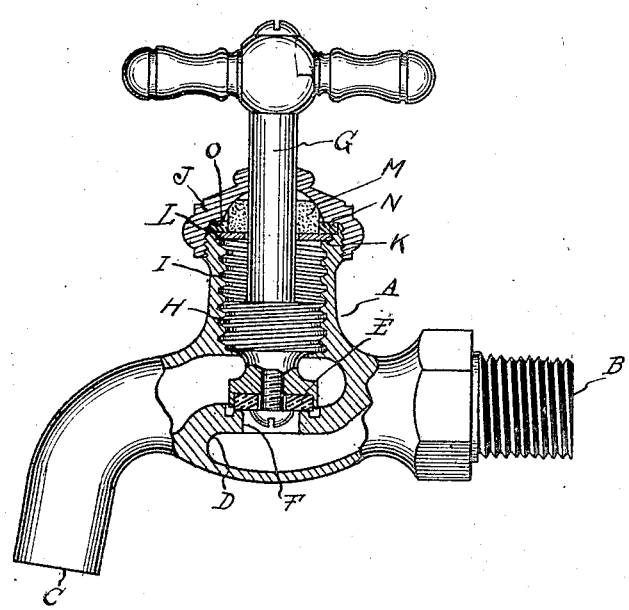
Inventor
Thomas Herbert Roberts
By Whittemore, Hulbert, Whittemore, and Belknap
Attorney Patented Feb. 5, 1924.

1,482,484

UNITED STATES PATENT OFFICE.

THOMAS HERBERT ROBERTS, OF DETROIT, MICHIGAN, ASSIGNOR TO ROBERTS BRASS MANUFACTURING COMPANY, OF DETROIT, MICHIGAN, A CORPORATION OF MICHIGAN.

BIB COCK.

Application filed November 14, 1921. Serial No. 514,852.

*To all whom it may concern:*

Be it known that I, THOMAS HERBERT ROBERTS, a citizen of the United States of America, residing at Detroit, in the county of Wayne and State of Michigan, have invented certain new and useful Improvements in Bib Cocks, of which the following is a specification, reference being had therein to the accompanying drawings.

This invention relates to valves and more particularly to bib cocks.

It is the object of the invention to provide an improved arrangement of packing, forming seals between the casing and a cap closing the opening admitting the valve member, and between said cap and the valve stem passing therethrough, without offering undue frictional resistance to turning of said stem.

The accompanying drawing comprises a sectional view of a bib cock employing the improved packing.

In said view A is a casing of a standardized form having the inlet B outlet C, and valve seating partition D. E is a valve controlling the port F in said partition and having its stem G formed with an enlarged threaded portion H engaging an interiorly threaded cylindrical portion I of the casing. J is a screw cap closing the portion I and having a substantially conical central recess through which the stem G passes. The portion I is countersunk slightly, as indicated at K, to permit a washer L embracing the stem to seat flush with the rim of said portion. Upon said washer are seated inner and outer packing rings M and N, the former snugly embracing the stem owing to a compression effected by the wall of the conical central recess in the cap. The outer ring N overlaps the rim of the portion I and is compressed by an annular shoulder O of the cap J.

The primary advantage derived by the invention is the independent seating of the two packing rings, avoiding any transmission of compression stresses from one to the other.

This arrangement avoids binding of the stem by its embracing packing. Such binding frequently occurs when the stem sealing ring is required to transmit a compression stress to the ring establishing a seal between the cap and casing. Preferably the ring M is formed, at least in part, of a fibrous material, and the outer ring N is of rubber. Also it is preferred to give the inner ring a thickness somewhat greater than that of the outer one so that the former may extend up into engagement with the conical central portion of the cap.

What I claim as my invention is:—

1. In a valve, the combination with a casing, having an opening for the introduction of a valve member, of a cap closing said opening, a valve member adapted to seat within said casing, a stem for said valve member passing through said cap, a packing establishing a seal between the cap and the casing, a packing establishing a seal between the stem and the cap, and a common seat for said packings upon which they are independently compressed by said cap.

2. In a valve, the combination with a casing, having an opening for the introduction of a valve member, of a cap closing said opening, a valve member adapted to seat within said casing, a stem for said valve member passing through said cap, a washer seated within said opening of the casing flush with the margin of said opening, and inner and outer packing rings independently compressed upon said washer by said cap, the former establishing a seal between the cap and stem and the latter between the cap and casing.

3. In a valve, the combination with a casing having an opening for the introduction of a valve member, of a cap closing said opening formed with a substantially conical central recess, a valve member seated within said casing, a stem for said member passing centrally through said cap, a washer embracing said stem and engaging said casing, a packing ring compressed by an annular portion of said cap against said casing and said washer, and a packing ring embracing said stem within the ring aforesaid and compressed against said washer by engagement with the wall of the conical recess in said cap.

4. In a valve, the combination with a casing having an opening for the introduction of a valve member, of a cap closing said opening and formed with a substantially conical central recess, a valve member seated within said casing, a stem for said member passing centrally through said cap, said casing having a counter-sunk portion, a washer embracing said stem and located in the counter-sunk portion of said casing, a packing ring compressed by an annular portion of the cap against said casing and said washer, and a packing ring embracing said stem within the ring aforesaid and compressed against said washer by engagement with the wall of the conical recess in said cap.

In testimony whereof I affix my signature.

THOMAS HERBERT ROBERTS.